United States Patent [19]
Winkelmann

[11] Patent Number: 6,047,278
[45] Date of Patent: Apr. 4, 2000

[54] METHOD FOR THE AUTOMATIC GENERATION OF A CONTROLLER

[75] Inventor: Klaus Winkelmann, Riemerling, Germany

[73] Assignee: Siemens Aktiengesellschaft, Munich, Germany

[21] Appl. No.: 08/930,017

[22] PCT Filed: Apr. 1, 1996

[86] PCT No.: PCT/DE96/00577

§ 371 Date: Sep. 26, 1997

§ 102(e) Date: Sep. 26, 1997

[87] PCT Pub. No.: WO96/32667

PCT Pub. Date: Oct. 17, 1996

[30] Foreign Application Priority Data

Apr. 11, 1995 [DE] Germany .......................... 195 13 801

[51] Int. Cl.[7] .................................................. G06F 17/00
[52] U.S. Cl. ................... 706/51; 706/51; 706/52
[58] Field of Search .................. 706/51, 52, 53; 364/188, 173; 710/34

[56] References Cited

U.S. PATENT DOCUMENTS

| | | | |
|---|---|---|---|
| 4,679,137 | 7/1987 | Lane et al. ............................. | 364/188 |
| 5,058,052 | 10/1991 | Sexton et al. ......................... | 395/708 |
| 5,416,908 | 5/1995 | DiCarlo et al. ....................... | 710/34 |
| 5,727,127 | 3/1998 | Schulze Horn et al. ............... | 706/52 |
| 5,737,213 | 4/1998 | Hallwirth .............................. | 364/173 |

FOREIGN PATENT DOCUMENTS

| | | |
|---|---|---|
| 0 208 997 A1 | 1/1987 | European Pat. Off. . |
| 0 209 795 A2 | 1/1987 | European Pat. Off. . |
| 0 420 174 A2 | 4/1991 | European Pat. Off. . |
| 0 424 056 A2 | 4/1991 | European Pat. Off. . |
| 37 43 438 A1 | 6/1989 | Germany . |
| WO 94/12914 | 6/1994 | WIPO . |

OTHER PUBLICATIONS

Automatisierungstechnische Praxis 37 (1995) 3, Carsten Joerns, Automatische Erzeugung von SPS–Programmen auf der Basis von Petri–Netzen, pp. 10–14.

Bulterman, "Embedded video in hypermedia document supporting integration and adaptive control", ACM Trans. Inf. Sys. vol. 13, No. 4, pp 440–47–, Oct. 1995.

Rosson, "Human factors in programming and software development", ACM computing survey, vo. 28, No. 1, Mar. 1996.

Cook et al, "Automating process discovery throgh event data analysis", ICSE ACM, pp 73–82, Jan. 1995.

Primary Examiner—Tariq R. Hafiz
Assistant Examiner—Anil Khatri
Attorney, Agent, or Firm—Hill & Simpson

[57] ABSTRACT

A method is described which aids the generation of a controller from an application-related formal specification. The method enables the generation of controllers which satisfy specified safety conditions, specifically in such a way that the generation process ensures that they are complied with. Constructs for specifying sequential and parallel sequences are provided, which allow the exclusive description of only the functionally desired aspects, so that a clear separation of safety and function is possible.

3 Claims, 4 Drawing Sheets

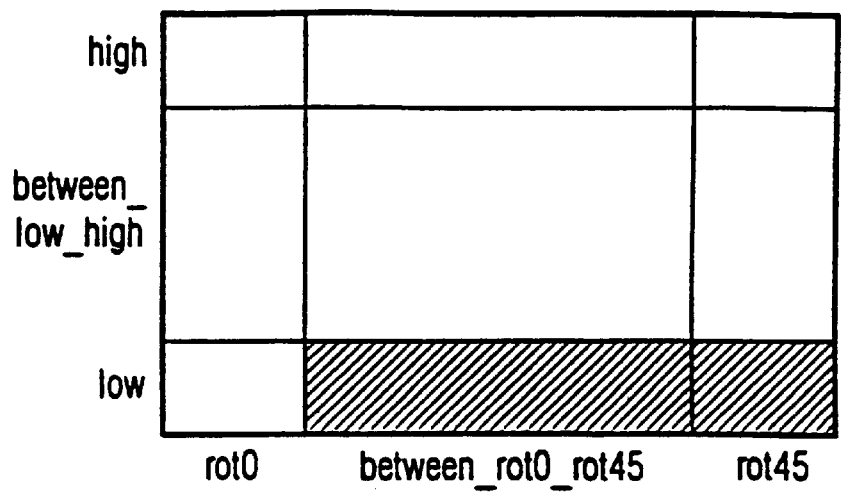
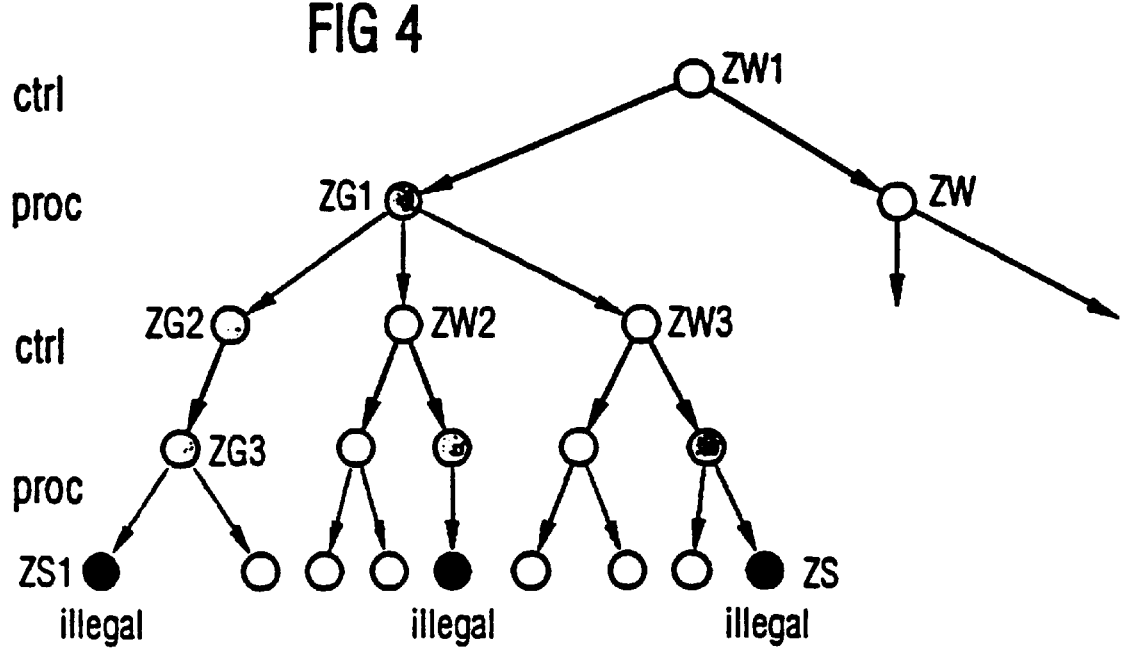

METHOD FOR THE AUTOMATIC GENERATION OF A CONTROLLER

BACKGROUND OF THE INVENTION

The efficient development of reliable software for reactive systems, which controllers of all types are, is nowadays a primary aim. FIG. 1 shows a schematic layout of a system comprising a controller and a process to be controlled. The controller must be designed in such a way that the process assumes only admissible states. The controller is fed input values, for example sensor values, at the inputs, these values being referred to as input states below. At the outputs, the controller outputs output values, referred to below as output states, which influence the process in such a way that it can assume only the admissible states.

During the programming of such memory-programmable controllers (programmable logic controllers), the following prescriptions must be observed in each case:

The mode of operation of the devices or processes to be controlled—that is to say what is effected by each individual output state of the controller, and how the sensor values which are supplied to the controller are to be interpreted.

The function to be implemented by the controller; for example movement sequences.

If appropriate, any restrictive safety conditions; for example if specific combinations of states or specific geometric configurations are to be avoided, specific actuators must only be activated if associated prior conditions (interlocks) are satisfied, etc.

These prescription are in each case available in a different, mostly informal, form. The technical problem is then to program a controller in such a way that it corresponds to the prescriptions.

By contrast with control engineering tasks, in which the theory knows about specific (standard) control algorithms, depending on process models, discrete control tasks have to be newly programmed in each case.

The programming of memory-programmable controllers is nowadays carried out in the manner in which the programmer defines the logical combinations according to which the output states are determined from the input states and the program states.

In order to program sequences there exist appropriate constructs of programming languages, in order to describe so-called step chains and parallel sequences. In each case, however, it is up to the programmer to ensure compliance with the function and the safety conditions. In other words, the relationship between the program and the abovementioned prescriptions is not documented explicitly.

One problem in the case of this procedure is the susceptibility to error, for even in the case of medium-sized systems the multiplicity of the possible system states is virtually incomprehensibly large; this means that cases are almost always overlooked, and programs have to be rewritten, with considerable effort, during the commissioning.

Even more serious is the problem that each rewrite, be it because of an error, because of changed environmental conditions or because of new requirements, impacts on the entire software—that is to say there is no mechanism which keeps the effects of a change local or else marks only those points impacted by a change.

SUMMARY OF THE INVENTION

The invention is based on the object of generating a controller from an application-related specification of a control task.

In general terms the present invention is a method for the automatic generation of a control algorithm, for a controller of a process. A non-deterministic automaton, which describes all the physically possible modes of behavior of the controller, is defined. The permitted state transitions of the process to be influenced by the controller are described. The automaton is set such that it satisfies prescribed safety conditions. In order to set the safety conditions, the largest subset that can be stabilized of the state set that is specified to be admissible is determined iteratively. The transfer function of the automaton is set such that in each case only those consequential states are selected which lie within this largest set that can be stabilized. The automaton is set such that it satisfies the function of the system comprising controller and process.

Advantageous developments of the present invention are as follows.

In order to comply with the safety conditions for the system comprising controller and process, the following states are excluded from the implementation:

each state of the controller in which all the consequential states do not satisfy the safety conditions; and each state of the process in which at least one consequential state does not satisfy the safety conditions.

In order to set the function of the system the function is defined by stating conditioned target states. Iteratively, the set is determined of all those states from which the transition into a target state can be forced in a finite number of steps. The transfer function is restricted in that, whenever possible, those transitions which lead to the target stare are executed.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 3 is an elevating rotary table;

FIG. 4, depicts two possibilities starting from a predetermined state;

DESCRIPTION OF THE PREFERRED EMBODIMENTS

Figure 1:
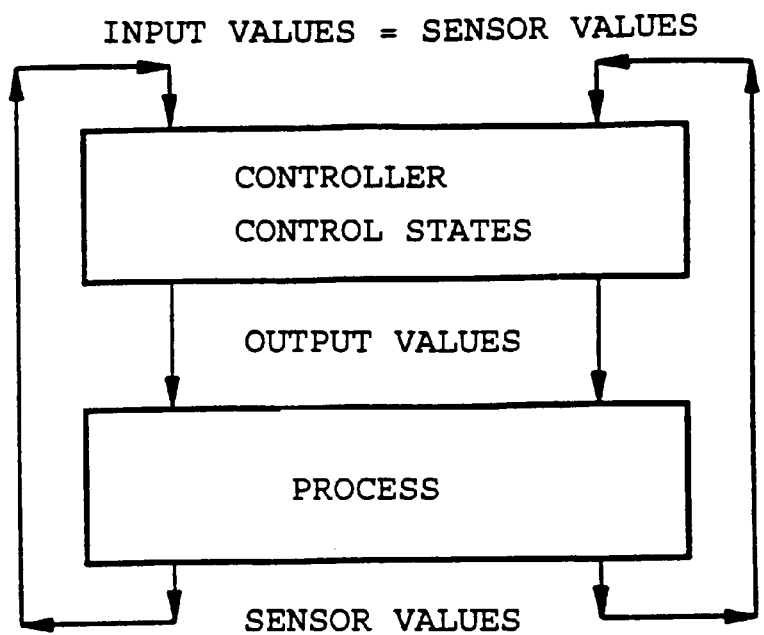
FIG. 1 is a block diagram of a system having a controller and a process to be controlled.

The invention is explained with reference to an exemplary embodiment, using a specification language which is to be referred to as CSLxt.

Fundamental representation of the invention 1.1 Basic concepts of CSLxt

The invention is based on the fact that the design process for reactive systems always begins with the following components (FIG. 2):

Description of the processes to be controlled,

Description of the desired function of the overall system, and

Safety requirements.

CSLxt comprises on the one hand linguistic means in order to describe the three components of the specification, and on the other hand the methods necessary for the generation of the controller.

The supporting basic elements of the approach are:

The specification using the concept of the finite automatons,
Distinguishing between state variables which can and cannot be influenced, and
The design of a controller by iteration methods.

The method is based on the hypothesis that each event in the process, that is to say each change in the sensor values, is followed by a reaction of the controller, that is to say a change in the actuator positions (output values). The interaction of controller and process is summarized as a two-person game, the controller pursuing a specific target—specifically of ensuring safety and function—while the process, as "opponent", attempts to impede this target in the least favorable case, but in any case does not cooperate. The behavior of the process (or of the processes) is now assumed to be given, the state variables which are described by sensor values cannot be (directly) influenced. On the other hand, the actuators can be influenced by the controller. The behavior of the controller—that is to say here the transfer function of the automaton, which describes the controller—is synthesized from the specification of the target.

This overall generation process proceeds as follows:
1. Definition of a non-deterministic automaton, which describes all the physically possible modes of behavior.
2. Description of the permitted state transitions.
3. Restriction of the automaton described by 1. and 2. to one which satisfies the safety characteristics.
4. Restriction of this automaton to one which satisfies the function.

The last two design steps make intensive use of iteration methods in the state space of the overall system. This may be understood as the controller looking ahead at the possible "plays". In this point, CSLxt differs significantly from most of the other specification method for reactive systems which, although they also calculate the transfer function of an automaton, always consider only one step (one "move", one transition).

The method relating to 3. is characterized by the following operation steps:
The largest subset which can be stabilized (in a sense to be made more precise) of the state set that is specified to be admissible (safe) is determined iteratively.
The transfer function is restricted in that only transitions to safe states are permitted.
The method relating to 4. is characterized by the following steps:
The function is described by stating conditional target states.
Iteratively, the set is determined of all those states from which the transition into a target state can be forced in a finite number of steps.
The transfer function is restricted in that, whenever possible, those transitions which lead "closer" to the target state are executed. In this case a state a is closer to the target than a state b if fewer steps are needed from a than from b in order to arrive at the target state.
During the calculation of these state sets, it is taken into account that well-defined "fairness" assumptions apply to the behavior of the controlled process, that is to say that specific events must in each case occur after an unknown but finite number of steps.

1.2 Elevating rotary table example, FIG. 3

In order to illustrate the invention, a simple elevating rotary table, which is briefly described here, is used:

The function of the elevating rotary table is to lift and to rotate (about a vertical axis) a part, which comes from a supply belt, into a position in which a robot can then grip said part.

Accordingly, there are the commands up, down and stop for the vertical movement and rotate_plus (abbreviated rot_plus), rot-minus, rot_stop for the rotary motion.

There are two light barriers, "low" and "high" for the vertical position, and an analog signal which reports the angle of rotation. However, we consistently make the following simplifying assumption for the inputs: an interface component, which is outside the controller specified here, converts the input values in such a way that there is in each case precisely one of three possible values for the two dimensions, namely low, between_low_high, or high, and rot0, between_rot0_rot45, or rot45.

One is thus effectively working with discretized (qualitative) values.

The positions (low, rot0) and (high, rot45) in this case correspond to the position in which a part has been deposited from the supply belt or can be taken away by the robot.

Figure 2:
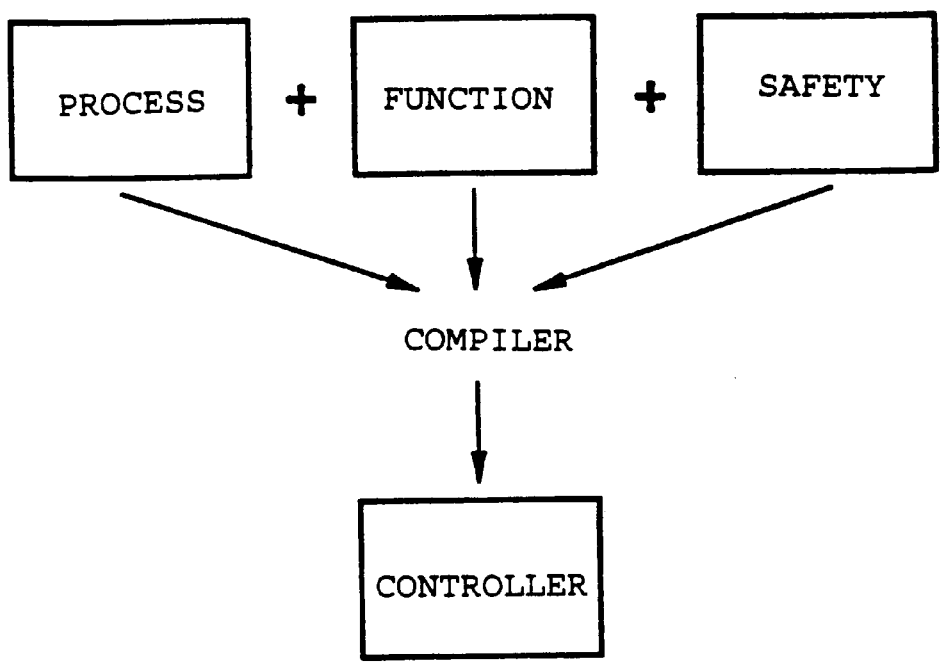
FIG. 2 is a block diagram depicting initial components.

The following safety requirements have to be complied with in the elevating rotary table:

"In the lower position (sensor low=on), the table must not be rotated" (since specifically the table would otherwise collide with the directly adjacent supply belt) or, of equal significance in the presence context:

"In the lower position (low), only the angle of rotation 0 (rot0) is admissible" (see FIG. 2, hatched region=forbidden states).

The result of this for the movement of the elevating rotary table is that simultaneous movement upward and rotation are certainly possible, but only after the height between_low_high has been reached. This type of restriction is typical for many parallel sequences occurring in automation engineering.

2. Process modelling in CSLxt

As a precondition for the design of a safe and correct controller, a description of the sequences in the (uncontrolled) process is used, which description will be explained below.

2.1 Prescriptions relating to the use of CSLxt

In the case of the state attributes of the controller, the following are to be distinguished:
Input states or sensor states which can be set directly from outside,
Output states which directly influence the process, and
Internal states or control states.

It makes a contribution to the clarity also to distinguish these three types syntactically in a CSLxt program.

Using the example of the elevating rotary table, this may appear approximately as follows:

```
sensor_states: [
    vertical_pos: [low, between_low_high, high],
    rotary_pos: [rot0, between_rot0_rot45, rot45]
],
output_states: [
    moving_state: [stop, up, down],
    rotation_state: [rot_stop, rot_plus, rot_minus]
],
```

Note: The CSLxt language is used here to illustrate the concepts, but in its specific expression is not the subject matter of the application. For this reason, the syntax is not completely described.

2.2 Process modelling with constraints

In the process model is a matter of describing how the output states affect input states, that is to say which transitions from the input states are possible in the case of a given allocation of the outputs. To this extent, a distinction which has been introduced between input states, output states and internal states is the basis of the process model.

The process model can be described as a finite automaton which is coupled to the controller, that is to say it reads the output states and writes the input states of the controller. However, for the practical notation of the process model a representation is selected which does not make this viewing method explicit. From the point of view of a user, the process model is quite simply a relationship between input states and output states—which in the notation proposed below is therefore a part of a CSLxt specification. To this end, "process_description" is introduced as a new construct, and described with reference to the following example.

An example which is very simple but often occurs in practice is the monitoring of individual binary outputs by means of directly associated sensors, for example "output state: open lever, input state: lever is open". This type of relationships has until now been processed only in the head of the developer but not formally—a frequent error source.

For the following illustration, we select another somewhat more complex example which is once more exemplary for a type of output/input relationships which often occur: an output value prescribes the direction in which a specific input value is to be changed or to change. This situation is always present when a motor, which can change the position of a component in two directions, is used as the actuator.

It is assumed here that all the process values are abstracted to form qualitative values. Hence the output has the value range [stop, up, down] and the input, for example, three values such as [low, between_low_high, high].

The associated extract from the process model could then appear as follows in an application-related representation:
  process_description: [
   qual_deriv: [vertical_pos(low, between_low_high, high),
     moving_state(stop, up down)]

This is intended to signify that the attribute moving_state represents the qualitative derivative of the attribute vertical_pos, said values occurring.

Of course, in addition to qual_deriv, further variants are used, for example for more than three value intervals, possibly for motors having more than one speed, but also for relationships of another type. However, the field of application of the qual_deriv presented here and its close relatives is greater than is suggested by the presentation of a "motor" and a mechanical position.

Further examples, which can also be described as qualitative derivative, comprise:
valve positions or pumps as actuators and filling level sensors,
heating or cooling as actuator and temperature sensors.

According to the concept proposed here, the user does not need to describe the individual state transitions in detail in order to specify the process model, but merely has to use the predefined qualitative constraints, such as qual_deriv, for example. The process model for the elevating rotary table in this case comprises precisely two constraints, namely the abovementioned and a corresponding one for the rotation.

This is an additional effort which would not be necessary for the pure generation of a controller and is therefore also not usual in current control languages. However, it is justified by the usefulness of automatic generation.

3. Generation of the controller with safety properties

There follows an explanation of how, on the basis of the specification of a safety property, an automat program is to be transformed in such a way that it satisfies this property. A safety property is in this case to be understood as any stated logical condition in the state variables of an automat.

3.1 Specification of safety properties

A linguistic construct which is introduced in CSLxt for this purpose is called "safety_requirements" and may appear approximately as follows.

The semantics are simply defined in that the specified condition shall apply in every achievable state of the automat. It is irrelevant in this case whether a plurality of conditions or a conjunction of conditions is specified—from a practical point of view (debugging), a list of conditions (possibly also named) is to be preferred.

```
safety_requirements:
/*------SAFETY REQUIREMENTS --------------------*/
In the following, ∧ stands for logical "AND",
===> for logical implication
/* Part 1: Table is not lowered further than "low" */
not (vertical_pos = low ∧ moving_state = down)
/* . . . (analogously for the other limits). . . */
               ∧
/* Part 2: Table is not rotated in the "low" position */
(vertical_pos = low) ==>
(rotation_state = rot_stop ∧ rotary_pos = rot0)
/*------END SAFETY REQUIREMENTS-----*/
```

3.2 Solution by a minimax method

The system, comprising controller and controlled process, is now considered as a two-person game between the controller and the controlled process, as follows: The players, Proc (process) and Ctrl (controller) make their moves alternately. The aim of the player Ctrl is to remain within the states defined as safe. Proc acts blindly—but in order to manage the least favorable case, an "opponent" is introduced, to attempt to get into an unsafe state. Each player will take into account the possible counter moves. From game theory, minimax algorithms are known as methods which describe the optimum strategy for each player in this situation.

A priori, a safety requirement (safety_requirement) SR as in 3.1. is specified, and it is the task of the controller to guarantee compliance with it. However, it is not sufficient to avoid direct state changes into states outside SR, as indicated by FIG. 4 which shows a graphical representation of the successive states. The states of ctrl and proc are represented as circles whose dependence on one another is made clear by arrows. The circles filled with white represent permitted states ZW, the circles filled with gray represent states ZG which are to be avoided as dangerous, since it is true that: if the system gets into a gray state, it can no longer be guaranteed that it will not come into a forbidden, illegal state ZS which is represented by black circles. The task of the method is to avoid such "blind alleys".

Here, the following should be considered:
A state in which Proc is about to move is hazardous if there is a hazardous consequential state.
A state in which Ctrl is about to move is hazardous if all the consequential states are hazardous.

In the case of FIG. 4, Ctrl has two possibilities starting from the state ZW1. If Ctrl selects the left-hand branch, in the case of Proc a hazardous state ZG1 follows. ZG1 is hazardous because Proc is about to move and could choose ZG2. ZG2 is hazardous because there remains no other choice than ZG3. ZG3 is hazardous because Proc is about to move, via which the state ZS1 could be chosen. The other branches can be run through in a corresponding manner.

Working out the set of hazardous states is therefore possible, since the entire state set is finite and the conditions mentioned are always only able to add states. An iteration must therefore reach a fixed point after a finite number of steps.

"State sets" is always used below to designate sets of states of the controller. For each state set P, let acx(P) designate the set of all the states for which a transition into the set P can be forced in one step. Obviously, acx(P) comprises all states in which the controller is about to move, provided there is at least one consequential state in P, and all states in which the process is about to move and for which each consequential state is in P.

For each state set P, let the "largest subset that can be stabilized of P" designate the largest set Q for which Q is contained in P and Q is contained in acx(Q).

It will be illustrated first how the largest subset that can be stabilized of an arbitrary state set can be calculated:

Method for the construction of the largest subset that can be stabilized:

Let P be a state set.
1. Set $Q_0:=P$
2. Repeat step 3 until $Q_i=Q_{i+1}$
3. Set $Q_{i+1}:=acx(Q_i) \cap Q_i$
($\cap$ stands for the intersection of two sets)

Method for the construction of a safe controller:
1. Set SR:=Set of states which satisfy the specified safety requirements.
2. Set G:=largest subset that can be stabilized of SR
3. Define the function of the controller such that for each state a consequential state which lies in G is always chosen.

Result of the method:

If the initial state does not belong to G, then the specification cannot be satisfied. Otherwise, the design guarantees precisely that for each response of the process the controller always has a move (transition) which remains within the state set G.

4. Specification of the function

A controller which is only safe is of low practical value. It is of course also necessary to guarantee that it satisfies the desired function. In the sense of formal methods, the first precondition for this is a specification of this function. CSLxt knows two complementary linguistic means for the description of functional properties:
a) Specification by means of explicit statement of transitions
b) Declarative specification by means of the statement of conditional desired states.

Point a) does not require any new method and is therefore treated only briefly (Section 4.1). Point b) is an innovation of CSLxt and is presented in Section 4.2.

4.1 Explicit specification

Figure 5:
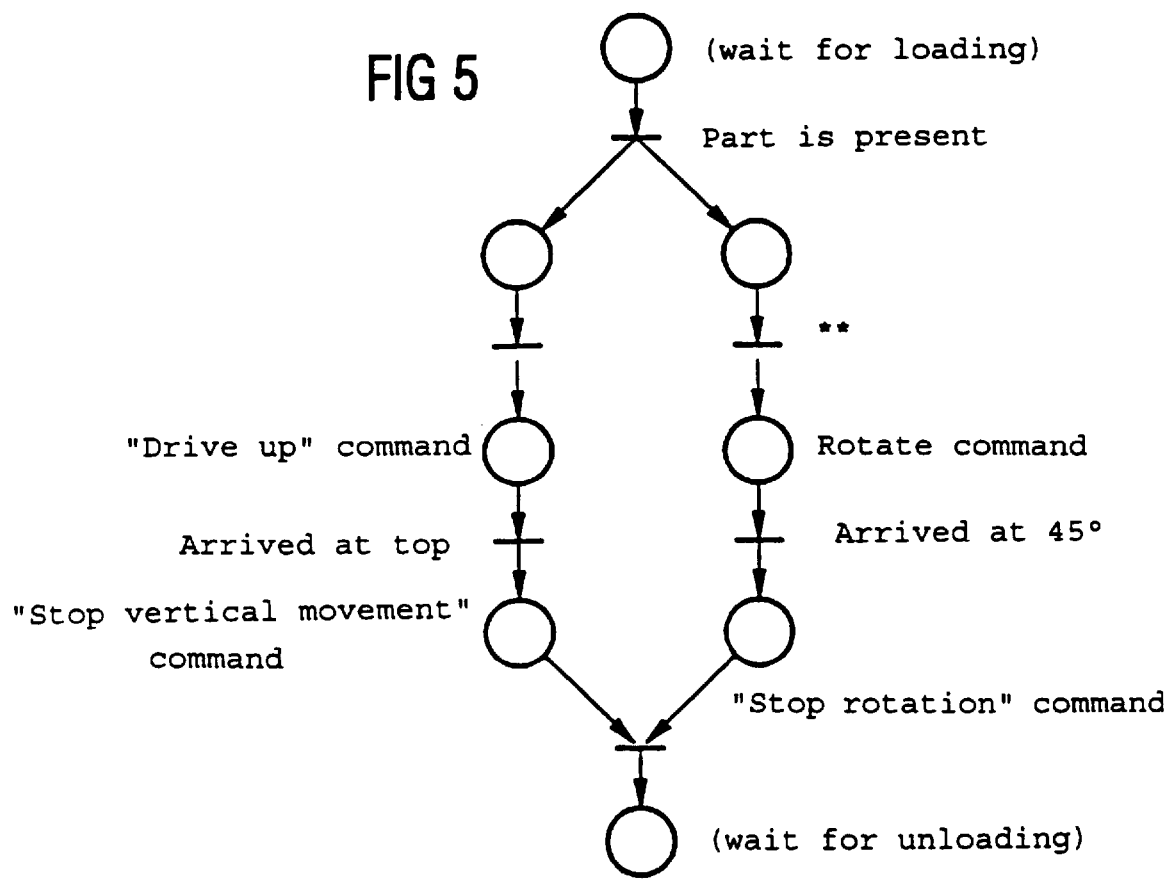
FIG. 5 depicts admissible transitions.

This section shows how the function of a controller can be described, so that in order to comply with safety properties, the method from Section 3. can be employed. Admissible transitions of the controller can be described, for example in the familiar Petri network notation, as in FIG. 5. Here, a circle stands in each case for one state of the controller, a horizontal stroke for a possible transition. Alongside the states, there are actions (output values) of the controller, alongside the transitions are preconditions which have to be satisfied at the time of the transition, such as sensor information for example.

The result of the minimax method is, in this example, that at the point in the diagram designated by **, an additional precondition is automatically incorporated, which guarantees compliance with the safety condition (only rotate when the vertical position is in the safe range). If the automat table is described by means of such explicit transitions, this restricts the degrees of freedom which are used for the generation of safety. If the explicit specification does not allow such degrees of freedom, the safety generation can no longer operate. Its result would then be either the safety properties are satisfied in any case or they can also not be satisfied by the iteration method; this then supplies the result "not OK".

Care should therefore be taken during the explicit specification that no unnecessary details are defined, but rather that the degrees of freedom which exist from a technological point of view also remain in existence in the specification.

4.2 Declarative specification

In the following text, the linguistic means are presented which are offered by CSLxt for the declarative specification of the functional properties. In this case, the advantages aimed at are a reduction in complexity, that is to say a simplification of the specification by concentrating on what is important, therefore elimination of error sources, application-related formulation of the functional properties.

The construct has the form function: [Pred1-Target1, Pred2-Target2, . . . ]

that is to say a list of pairs is specified. Pred1, Target1 etc. in this case stand for any arbitrary CSLxt conditions. The semantics of this construct can be described as follows: Target1 etc. specify the desired or target states. A desired state is in each case activated as a function of the associated precondition Pred. Put more precisely, for each pair Pred-Target:

as long as Pred is true, the controller will attempt to produce a state in which Target is true. This state is only left when Pred is no longer true. In the simplest case, the conditions Pred1, Pred2 and so on are disjunct in pairs—this corresponds to changing over between different operating states. However, this is not necessarily the case.

The function of the elevating rotary table is described as follows using the function construct:

```
function:[
    part_present is yes -
        vertical_pos = high ∧ rotary_pos = rot 45
    part_present is no -
        vertical_pos = low ∧ rotary_pos = rot0
]
```

For each pair Pred-Target, a separate iteration construction is carried out as described under 4.3. It supplies the following information as the result—as for the safety—

Initial state okay or not okay, and

Transition okay or not okay.

If both tests yield "okay", the resulting controller as per construction satisfies the functional property. Otherwise, this is not guaranteed.

4.3 Method for the function generation

In this section, the algorithm for generating the functional properties will be described.

Designations used

Let delta designate the transition relation of the controller. This is initially filled with a relation which represents prescribed restrictions, such as safety properties constructed in accordance with Section 3, for example.

In the course of the method, delta is further restricted and, if the method is concluded successfully, at the end it expresses just the solution, that is to say the controller which guarantees the function required.

Let $fair_i$ designate the set which is characterized by the following condition: "the current process step comprises an action of the ith process component". This condition is also designated as the (ith) fairness condition. Also reflected in this is the implicit presupposition that each independent component of the process becomes active "over and over again", that is to say in each case after a finite time. The method uses this assumption in the following way: progress in the direction of a sought-after state can also be achieved by the occurrence of a fairness condition forcing such a transition.

For each state set P, let acx(P) designate the set of all the states for which a transition into the set P can be forced in one step.

The greatest subset that can be stabilized of P can be calculated as described under 3.

The designations $win_{n,j}$, $winX_n$, $aux_{n,i}$ stand for state sets which are calculated in the course of the method:

Method

The following algorithm is worked through for each pair "Pred-Target".

(1) Set $win_{0,0}$:=largest subset that can be stabilized of Target.
(2) Repeat steps (3) to (10) for n=0,1,2, . . . , until $$win_{n+1,0} = win_{n,0}$$

(3) Repeat steps (4) and (5) for j=0,1,2, . . . until $$win_{n,j+1} = win_{n,j}$$

(4) Set $win_{n,j+1}$:=$win_{n,j} \cup acx(win_{n,j})$
 that is to say, the set $win_{n,j+1}$ comprises all the states of the set $win_{n,j}$ plus the states from which a transition into the set $win_{n,j}$ can be forced in one step.
(5) Restrict the transfer function delta such that, whenever possible, the set $win_{n,j+1}$ is no longer left.
(6) Set $winX_n$:=$win_{n,j}$
(7) Repeat steps (8) and (9) for each fairness condition $Fair_i$:
(8) Set $aux_{n,i}$:=greatest subset that can be stabilized of ($winX_n \cup$ (set of states S, so that: if S lies within $Fair_i$, then each consequential state is in $winX_n$))
(9) Restrict the transfer function delta such that, whenever possible, the set $aux_{n,i}$ is no longer left
(10) Finally, set $win_{n+1,0}$:=$aux_{n,1} \cup aux_{n,2} \cup \ldots \cup aux_{n,k}$ Success criterion:

The generated controller is correct if the following is true at the conclusion:
(1) the initial state of the system lies in the set $win_{n,0}$
(2) for each state in $win_{n,0}$ all the consequential states also lie in $win_{n,0}$.

Figure 6:
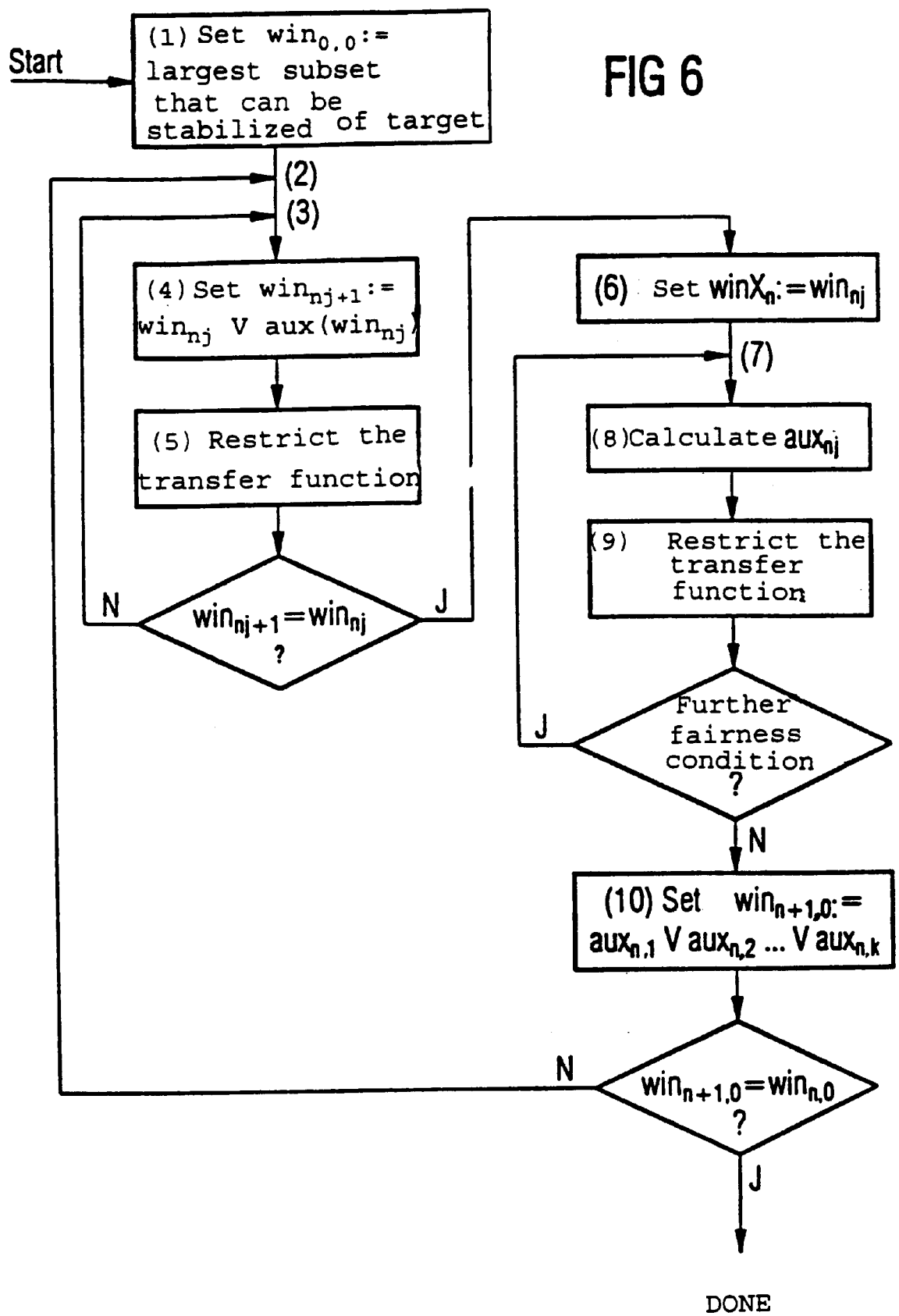
FIG. 6, is a flow diagram of the present invention.

The method is illustrated once more as a flow diagram in FIG. 6.

A complete code example for the elevating rotary table is specified below:

```
/* CSLxt code for elevating rotary table*/
declTyp(rot_table,
  sensor_states: [
    part_present:[yes, no],
    vertical_pos:[low, between_low_high, high],
    rotary_pos: [rot0, between_rot0_rot45, rot45]],
  initial_states: [
    moving_state: [stop, up, down],
    rotation_state: [rot_stop, rot_plus, rot_minus]],
```

```
          -continued process_description:[
    qual_deriv:[vertical_pos, low, between_low_high, high,
moving_state, stop, up, down],
    qual_deriv:[rotary_pos, rot0, between_rot0_rot45, rot45
    rotation_state, rot_stop, rot_plus, rot_minus,]],
  safety_requirements:
  */Do not lower the table further than "low"*/
  not (vertical_pos=low ∧ moving_state=down)/*
  (etc. for the other limits)*/
  /*Do not rotate the table in the "low" position*/
  ∧      ((vertical_pos=low)==>
           (rotation_state=rot_stop) ∧ (rotary_pos =rot0)),
  function: [
    part_present is yes -
      (vertical_pos=high) ∧ (rotary_pos=rot45),
    part_present is no -
      (rotary_pos=rot0) ∧ (vertical_pos=low)]
  ]
  /*--------------END TYP rot_table---------------*/
```

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for automatically generating a control algorithm, for a controller of a process, comprising the steps of:
   a) defining a non-deterministic automaton, which describes all physically possible modes of behavior of the controller;
   b) describing permitted state transitions of the process to be influenced by the controller;
   c) setting, the automaton such that the automaton satisfies prescribed safety conditions;
   d) iteratively determining, in order to set the safety conditions, a largest subset that is stabilizable of a state set that is specified admissible, and setting a transfer function of the automaton such that in each case only consequential states are selected which lie within said largest set that is stabilizable; and
   e) setting the automaton such that the automaton satisfies a function of a system that has the controller and the process.

2. The method as claimed in claim 1, wherein, in order to comply with the safety conditions for the system having the controller and the process, the following states are excluded from implementation:
   a) each state of the controller in which all consequential states do not satisfy the safety conditions; and
   b) each state of the process in which at least one consequential state does not satisfy the safety conditions.

3. The method as claimed in claim 1, wherein, in order to set the function of the system
   a) the function is defined by stating conditioned target states,
   b) iteratively, a set is determined of all those states from which the transistion into a target state can be forced in a finite number of steps,
   c) the transfer function is restricted in that, whenever possible, those transitions which lead to the target state are executed.

* * * * *